US010816327B2

(12) United States Patent
Yuan et al.

(10) Patent No.: US 10,816,327 B2
(45) Date of Patent: Oct. 27, 2020

(54) APPARATUS AND METHOD FOR DETERMINING TREAD DEPTH

(71) Applicant: Zebra Technologies Corporation, Lincolnshire, IL (US)

(72) Inventors: Zhijia Yuan, Huntington, NY (US); David S. Koch, East Islip, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 102 days.

(21) Appl. No.: 16/136,740

(22) Filed: Sep. 20, 2018

(65) Prior Publication Data

US 2020/0096325 A1    Mar. 26, 2020

(51) Int. Cl.
*G01M 17/02* (2006.01)
*G01B 11/22* (2006.01)
(Continued)

(52) U.S. Cl.
CPC .............. *G01B 11/22* (2013.01); *G01B 21/18* (2013.01); *G01L 17/005* (2013.01); *G01M 17/027* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00;
(Continued)

(56) References Cited

U.S. PATENT DOCUMENTS 5,054,918 A * 10/1991 Downing ........... G01B 11/2504
                                                      33/203
9,779,561 B1    10/2017 Dorrance et al.
(Continued)

FOREIGN PATENT DOCUMENTS

WO        2015153954 A1    10/2015

OTHER PUBLICATIONS

International Search Report and Written Opinion for International Application No. PCT/US2019/039389 dated Sep. 27, 2019.

*Primary Examiner* — Andre J Allen

(57) ABSTRACT

A device for measuring tread depth includes: an image sensor; first and second depth sensing modules spaced apart along a separation axis, each including (i) an emitter configured to emit a beam of light, and (ii) an optical assembly configured to direct reflections of the beam of light onto a respective region of the image sensor; a controller connected to the image sensor and configured, responsive to the device traversing a treaded surface, to: receive, from the image sensor, a sequence of images corresponding to sequential positions of the device traversing the treaded surface in a travel direction substantially perpendicular to the separation axis, the sequence of images depicting successive reflections of the beams from the treaded surface; determine, for each image in the sequence of images, a first depth measurement and a second depth measurement; and store, in a memory, the first and second depth measurements.

18 Claims, 13 Drawing Sheets

(51) Int. Cl.
*G01L 17/00* (2006.01)
*G01B 21/18* (2006.01)

(58) Field of Classification Search
CPC ............ G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28; G01L 17/00; G01L 17/005; G01L 19/0645; G01L 19/147; G01L 1/16; G01L 1/18; G01L 7/187; G01L 9/0052; G01L 9/008
USPC .................................................. 73/146–146.8
See application file for complete search history.

(56) References Cited

U.S. PATENT DOCUMENTS

| | | | |
|---|---|---|---|
| 2012/0067115 A1* | 3/2012 | Pingel | G01B 11/22 73/146 |
| 2012/0204632 A1* | 8/2012 | Kirstatter | B60C 11/24 73/121 |
| 2014/0240492 A1 | 8/2014 | Lee | |
| 2015/0268132 A1* | 9/2015 | Luther | G01M 17/027 356/631 |
| 2015/0330773 A1* | 11/2015 | Uffenkamp | G01B 11/22 356/631 |
| 2017/0343337 A1* | 11/2017 | Muller | G01B 11/0608 |
| 2017/0368890 A1* | 12/2017 | Rodriguez Vazquez | B60C 11/246 |
| 2020/0018591 A1* | 1/2020 | Rose | G01M 17/027 |
| 2020/0098121 A1* | 3/2020 | Tenkasi Shankar | G06T 7/50 |

* cited by examiner

APPARATUS AND METHOD FOR DETERMINING TREAD DEPTH

BACKGROUND

Tire wear dictates the need for replacement of a tire, and is typically assessed by measuring the depth of tire treads. A worn tire exhibits shallower treads, and may require replacement. Tire tread depth is typically measured manually with a tread depth gauge, but such measurements may be prone to inaccuracies or measurement errors. Other tread depth measurement mechanisms, such as imaging-based mechanisms, may suffer from incorrect detection of tire treads, leading to inaccurate assessments of tire wear.

BRIEF SUMMARY OF INVENTION

Examples disclosed herein are directed to a device for measuring tread depth, comprising: an image sensor; a first depth sensing module including (i) a first emitter configured to emit a first beam of light, and (ii) a first optical assembly configured to direct reflections of the first beam of light onto a first region of the image sensor; a second depth sensing module spaced apart from the first depth sensing module along a separation axis, the second depth sensing module including (i) a second emitter configured to emit a second beam of light; and (ii) a second optical assembly configured to direct reflections of the second beam of light onto a second region of the image sensor; a controller connected to the image sensor and configured, responsive to the device traversing a treaded surface in a travel direction substantially perpendicular to the separation axis, to: receive, from the image sensor, a sequence of images corresponding to sequential positions of the device traversing the treaded surface in the travel direction, the sequence of images depicting successive reflections of the first and second beams from the treaded surface; determine, for each image in the sequence of images, a first depth measurement and a second depth measurement; and store, in a memory, the first and second depth measurements.

Additional examples disclosed herein are directed to a method of measuring tread depth in a device having an image sensor, a controller, a first depth sensing module and a second depth sensing module spaced apart from the first depth sensing module along a separation axis, the method comprising: emitting a first beam of light from a first emitter of the first depth sensing module, and directing reflections of the first beam of light onto a first region of the image sensor; emitting a second beam of light from a second emitter of the second depth sensing module, and directing reflections of the second beam of light onto a second region of the image sensor; at the controller, responsive to the device traversing a treaded surface in a travel direction substantially perpendicular to the separation axis: receiving, from the image sensor, a sequence of images corresponding to sequential positions of the device traversing the treaded surface in the travel direction, the sequence of images depicting successive reflections of the first and second beams from the treaded surface; determining, for each image in the sequence of images, a first depth measurement and a second depth measurement; and storing, in a memory, the first and second depth measurements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
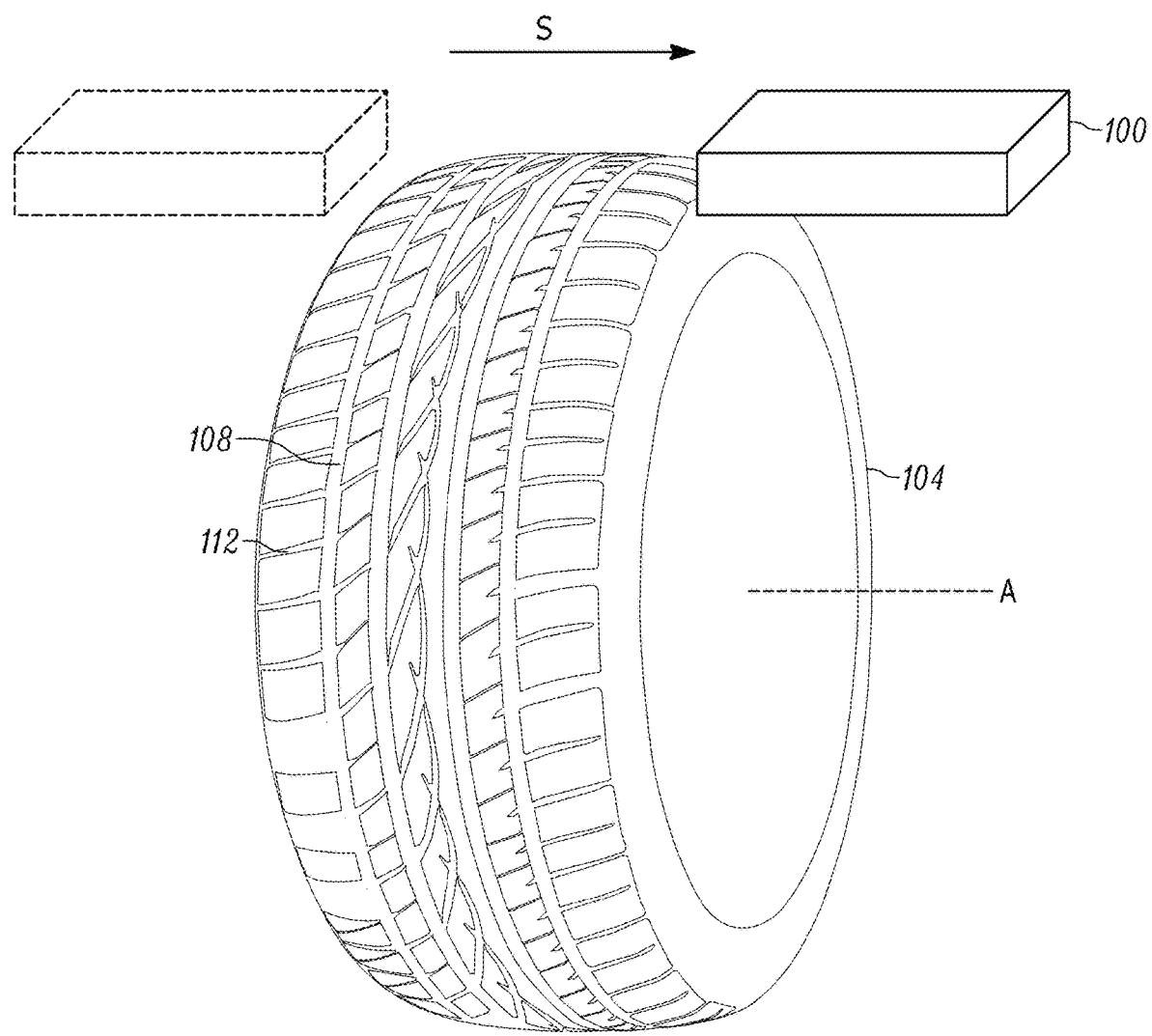
FIG. 1A illustrates a computing device for capturing depth scan data from a tire.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1A depicts a tread measurement device 100 (also referred to herein simply as the device 100) configured to determine tread depth for a treaded object, such as a tire 104. The tire 104 is shown in isolation but may be mounted on a vehicle, such as an automobile, delivery van, trailer, or the like. In particular, the device 100 is configured to determine the depth of at least a subset of a plurality of treads of the tire 104. The treads of the tire 104 may include major treads 108 and minor treads 112. The major treads 108 (of which the tire 104 as illustrated includes four) typically extend continuously around the circumference of the tire 104. Minor treads 112, as seen in FIG. 1A, may not extend continuously around the circumference of the tire 104. The minor treads 112 may also have smaller tread depths than the major treads 108.

In the present example, the device 100 includes a mobile computing device, such as a mobile computer (e.g. a handheld computer) equipped with depth sensing modules, which may be integrated with the device 100 or implemented in a discrete accessory mountable on the device 100. The device 100 is configured to measure tread depths by traversing (e.g. via manipulation by an operator) the tire 104 or other object having a tread pattern to be scanned in a travel direction "S". In the present example, in which the object to be scanned is the tire 104, the travel direction S is parallel to an axis A of the tire (i.e. perpendicular to the major treads 108 in the illustrated example).

Figure 1B:
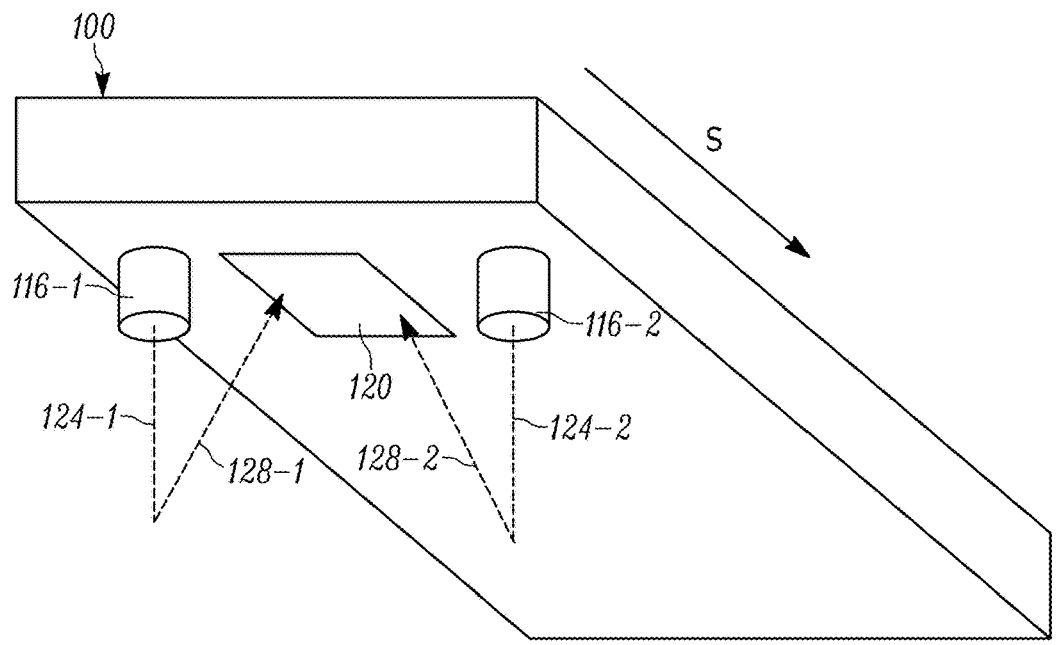
FIGS. 1B and 1C are schematics of the computing device of FIG. 1A during capture of the depth scan data.
Figure 1C:
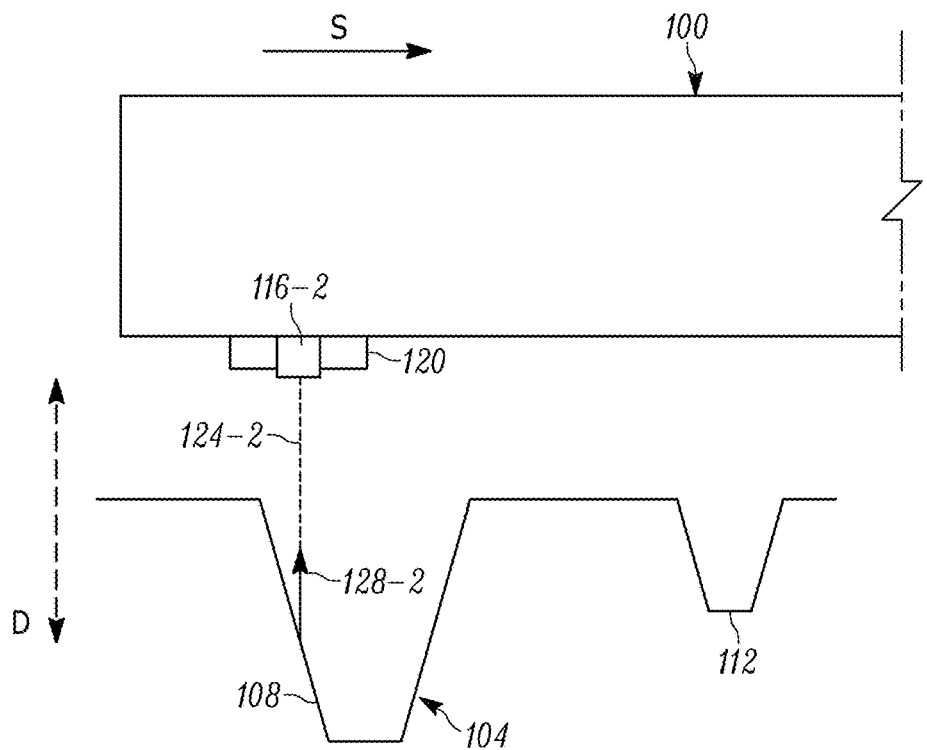

As seen in FIGS. 1B and 1C, the device 100 includes a pair of depth sensing modules each including a light emitter 116-1, 116-2 (hereinafter "emitters 116"). The device 100 also includes an image sensor 120, such as a linear charge-coupled device (CCD). The emitters 116 can be laser emitters, or other suitable emitters of electromagnetic radiation, including optical emitters. The emitters 116 are configured to emit respective beams 124-1, 124-2 of light (e.g. laser beams), reflections 128-1 and 128-2 of which is captured by the image sensor 120. The depth sensing modules also include optical assemblies (not shown in FIGS. 1B and 1C for clarity) for directing the reflections 128 to corresponding portions of the image sensor 120. That is, the reflection 128-1 is directed to a first portion of the images sensor 120, while the reflection 128-2 is directed to a second portion of the images sensor 120. As will be apparent to those skilled in the art, the specific position that each reflection 128 impacts the image sensor 120 within the corresponding portion of the image sensor 120 varies with the origin of the reflection 128 (i.e. with the depth and/or shape of the surface from which the reflection 128 originated).

As the device 100 traverses the surface of the tire 104 along the travel direction S, a plurality of first and second reflections 128-1 and 128-2 are therefore captured via the image sensor 120. Each pair of reflections 128-1 and 128-2 corresponds to a different position along the surface of the tire 104 in the travel direction S. The device 100 is further configured, based on the position of the reflections 128 as captured by the image sensor 120, and on the known position of the image sensor 120 relative to the emitters 116 and the above-mentioned optical assemblies, to determine a depth D from the image sensor 120 to the point on the tire 104 at which the corresponding reflection 128 originated.

Before discussing the functionality of the computing device 100 in greater detail, certain components of the computing device 100 will be described with reference to FIGS. 2A and 2B.

Figure 2A:
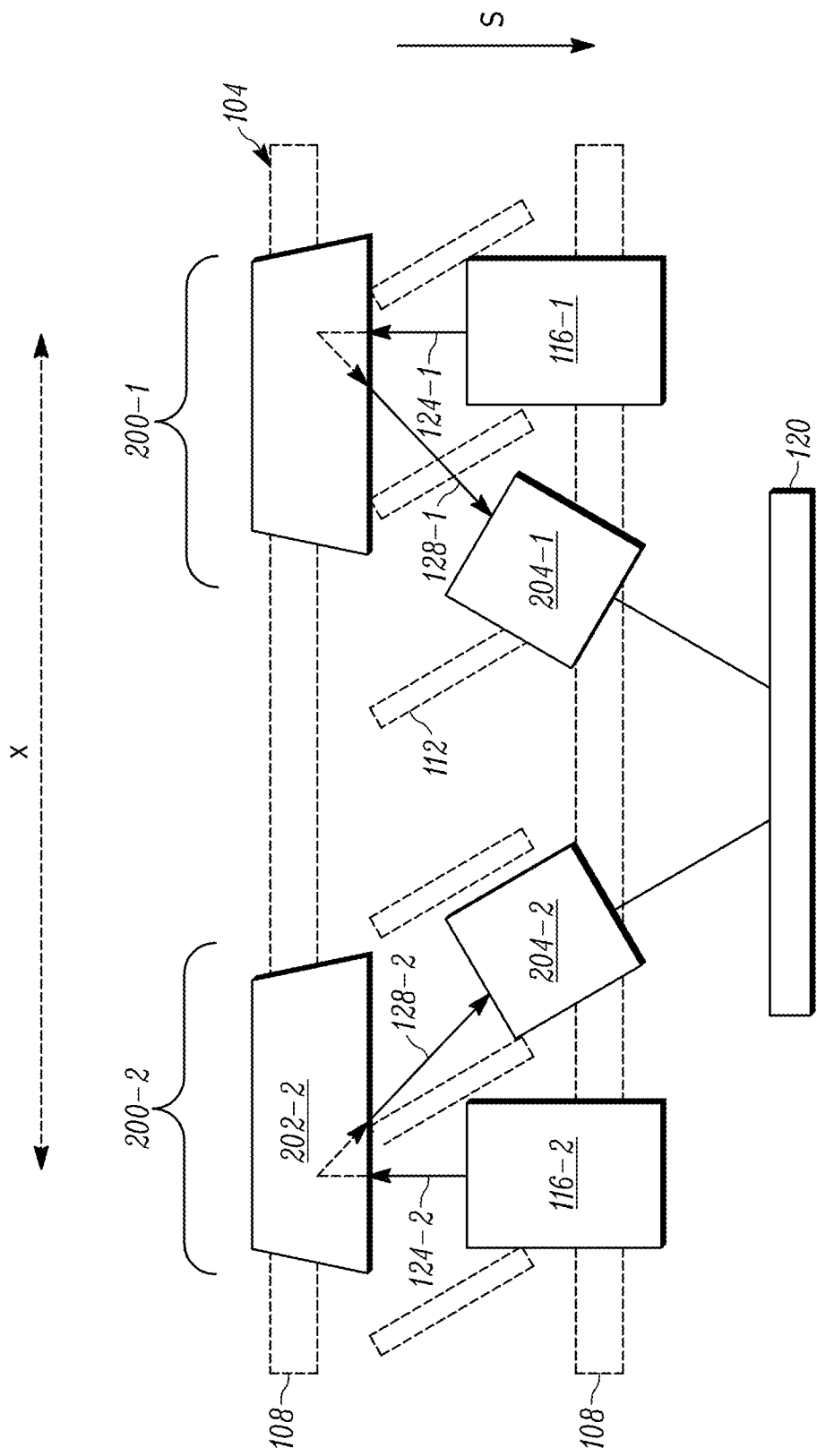
FIG. 2A is a block diagram of the depth sensing modules of the device of FIGS. 1A-1C.

FIG. 2A illustrates the above-mentioned depth sensing modules 200-1 and 200-2 in greater detail. In particular, FIG. 2A is an overhead view of the device 100, with all but the depth sensing modules 200 and the image sensor 120 omitted, as the device 100 travels over the treads 108 and 112 of the tire 104 in the travel direction S. A first depth sensing module 200-1 includes the first emitter 116-1 mentioned earlier, as well as a first mirror 202-1 configured to redirect the path of the beam 124-1 towards the tire 104 (i.e. into the page, as illustrated). The mirror 202-1 also redirects the reflection 128-1 from the tire 104 (travelling out from the page, as illustrated) towards a first optical assembly 204-1. The optical assembly 204-1 includes one or more lenses, mirrors or the like, and is configured to direct the reflection 128-1 to the image sensor 120. The device 100 also includes a second depth sensing module 200-2 including the second emitter 116-2, a second mirror 202-2 and a second optical assembly 204-2. In some embodiments, the mirrors 202-1 and 202-2 may be implemented as a single mirror extending along both the first and second depth sensing modules 200. In further embodiments, the emitters 116 and optical assemblies 204 can be mounted within the device 100 to directly face the tire 104, and the mirrors 202 can be omitted. As shown in FIG. 2A, the optical assemblies 204 are disposed at an angle relative to the beams 124 (i.e. the optical axes of the optical assemblies 204 are not parallel to the beams 124), to increase utilization of the field of view of the optical assemblies 204.

As seen in FIG. 2A, the first and second depth sensing modules 200 are spaced apart along a separation axis "X" by a predetermined distance, shown in FIG. 2A as the distance between the optical axes of the emitters 116-1 and 116-2 (that is, the path along which the beams 124-1 and 124-2 travel from the emitters 116-1 and 116-2, respectively). The axis X is substantially perpendicular to the travel direction S (and therefore, substantially parallel to the major treads 108). The separation of the depth sensing modules results in each depth sensing module collecting reflections 128 that correspond to a different portion of the tire 104 for a given position along the travel direction S.

Figure 2B:
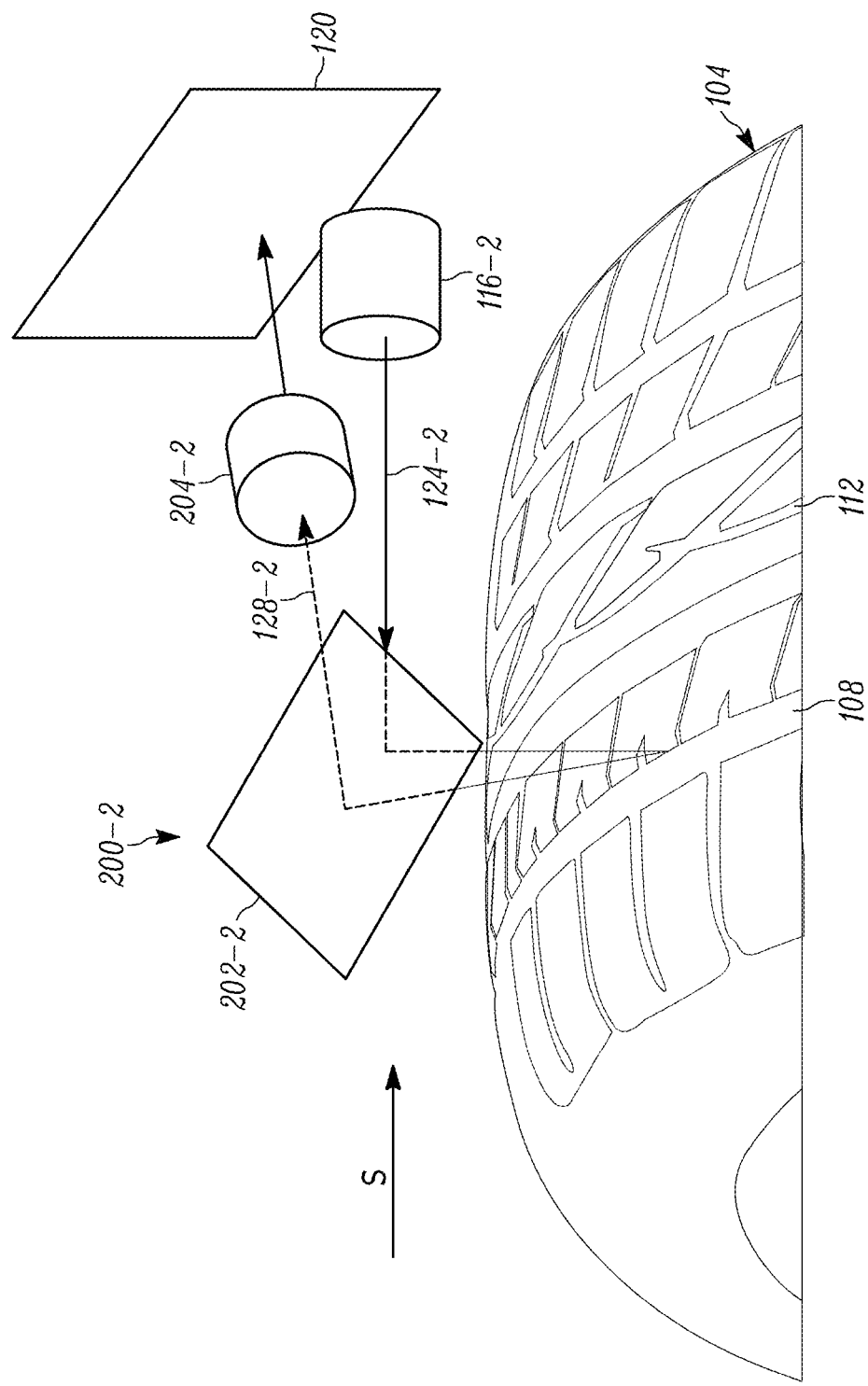
FIG. 2B is a perspective illustration of a depth sensing module of FIG. 2A.

FIG. 2B illustrates a perspective view of the depth sensing module 200-2 in isolation (i.e. omitting the depth sensing module 200-1), in which the beam 124-2 is shown being redirected by the mirror 202-2 toward the tire 104. Following reflection of the beam 124-2 by the tire, a reflected portion of the beam 124-2 returns towards the mirror 202-2, where the reflection 128-2 is redirected toward the optical assembly 204-2, which in turn directs the reflection 128-2 to the image sensor 120.

Figure 2C:
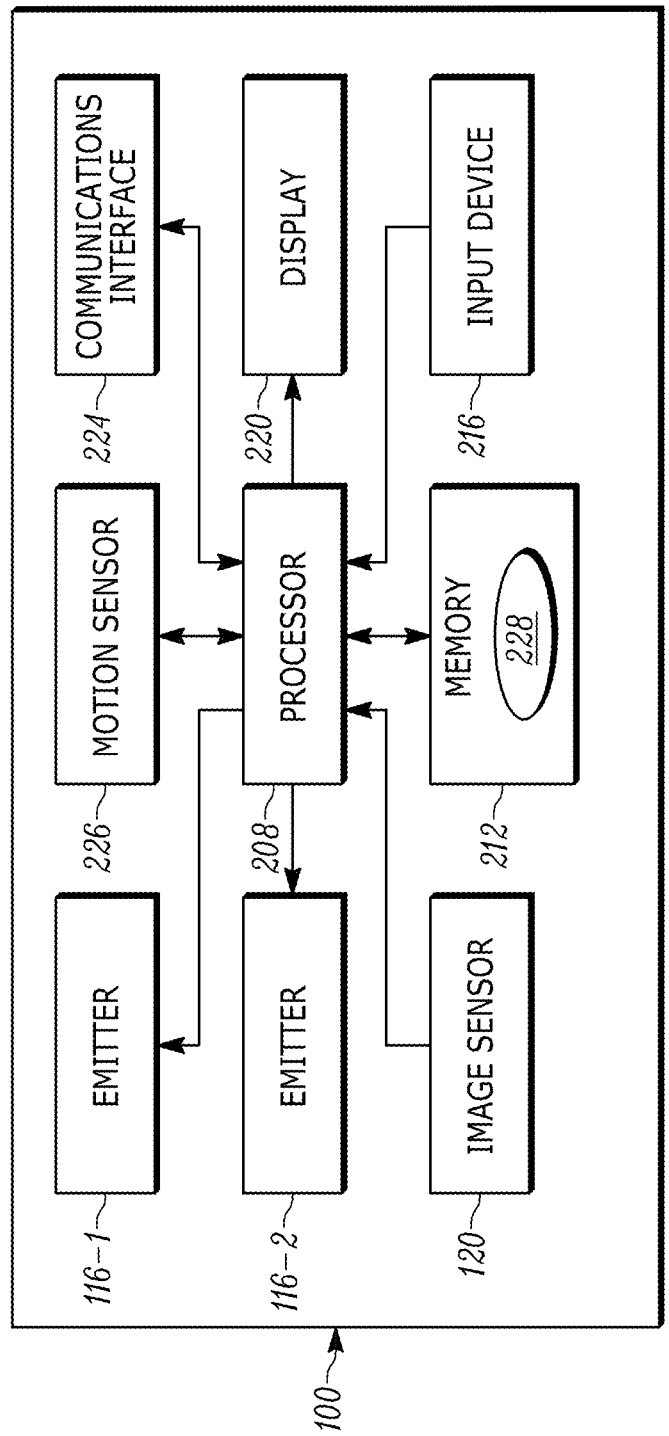
FIG. 2C is a block diagram of certain internal hardware components of the device of FIGS. 1A-1C.

Turning to FIG. 2C, in addition to the components noted above, the device 100 includes a central processing unit (CPU), also referred to as a depth processor 208, interconnected with a non-transitory computer readable storage medium, such as a memory 212. The memory 212 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 208 and the memory 212 each comprise one or more integrated circuits.

The device 100 also includes at least one input device 216 interconnected with the processor 208. The input device 216 is configured to receive input and provide data representative of the received input to the processor 208. The input device 216 includes any one of, or a suitable combination of, a touch screen, a keypad, a trigger button, a microphone, and the like. The device 100 also includes a display 220 (e.g. a flat-panel display integrated with the above-mentioned touch screen) interconnected with the processor 208, and configured to render data under the control of the processor 208. The device 100 can also include one or more output devices in addition to the display 220, such as a speaker, a notification LED, and the like (not shown).

The device 100 also includes a communications interface 224 interconnected with the processor 208. The communications interface 224 includes any suitable hardware (e.g. transmitters, receivers, network interface controllers and the like) allowing the device 100 to communicate with other computing devices via wired and/or wireless links (e.g. over local or wide-area networks, universal serial bus (USB) connections, and the like). The specific components of the communications interface 224 are selected based on the type(s) of network(s) or other links that the device 100 is required to communicate over.

The device 100 can also include a motion sensor 226 interconnected with the processor 208, such as an accelerometer, an inertial measurement unit (IMU) containing an accelerometer and a gyroscope, or the like. In other embodiments, the motion sensor 226 can be omitted, however.

The memory 212 of the device 100 stores a plurality of applications, each including a plurality of computer readable instructions executable by the processor 208. The execution of the above-mentioned instructions by the processor 208 causes the device 100 to implement certain functionality, as discussed herein. The applications are therefore said to be configured to perform that functionality in the discussion below. In the present example, the memory 212 of the device 100 stores a depth scanning application 228, also referred to herein as the application 228. The device 100 is configured, via execution of the application 228 by the processor 208, to control the depth sensing modules to collect image data depicting reflections 128 as the device 100 traverses the tire 104 in the travel direction S, and to generate depth measurements from the collected image data. The device 100 can also be configured, as will be discussed below in greater detail, to identify regions of interest from the depth measurements (e.g. corresponding to the major treads 108).

In other examples, the processor 208, as configured by the execution of the application 228, is implemented as one or more specifically-configured hardware elements, such as field-programmable gate arrays (FPGAs) and/or application-specific integrated circuits (ASICs). In still further embodiments, as will be discussed in greater detail below, the functionality of the device 100 may be implemented in distinct physical devices which cooperate to obtain the above-mentioned depth measurements.

Figure 3:
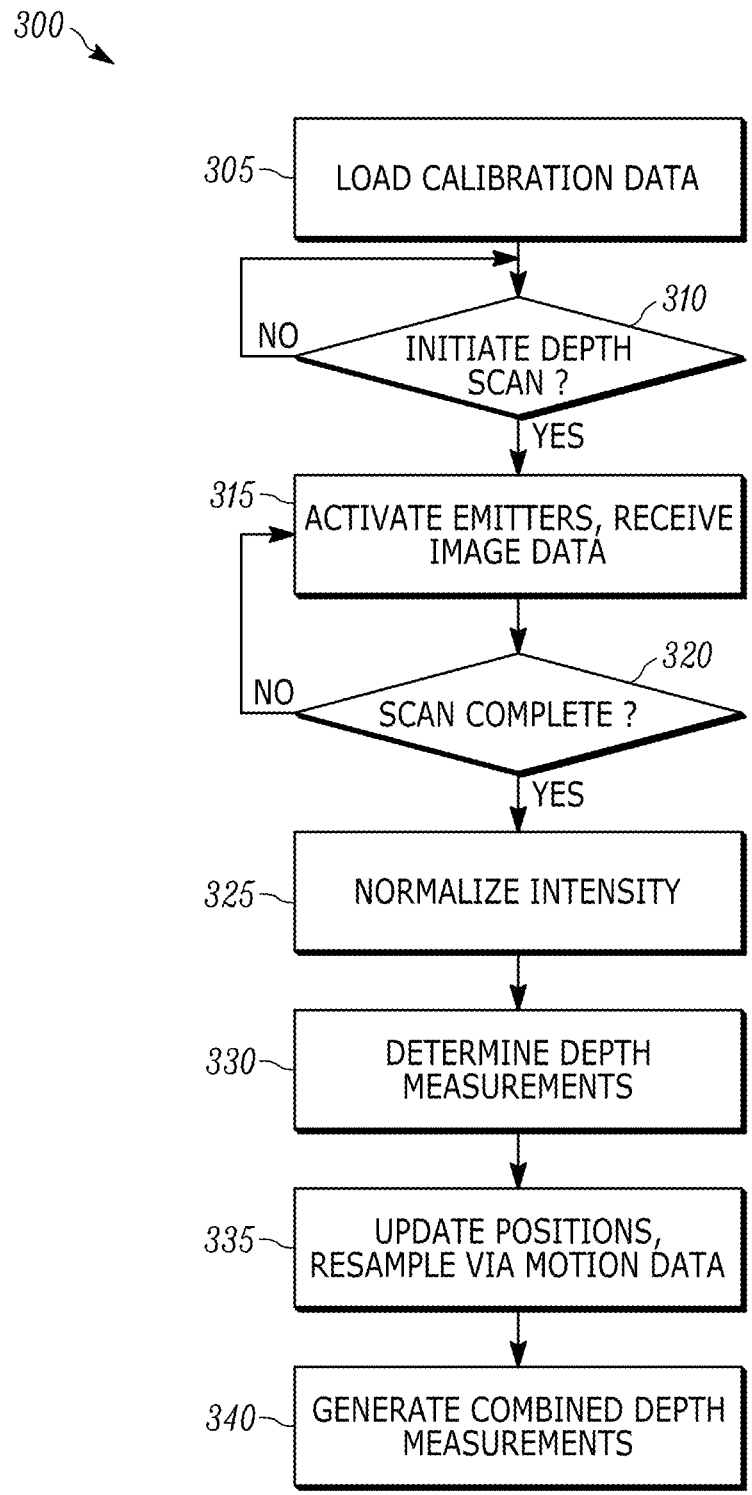
FIG. 3 is a flowchart of a method of measuring tread depth.

The functionality implemented by the device 100 via execution of the application 228 will now be described in greater detail, with reference to FIG. 3. FIG. 3 illustrates a method 300 of measuring tread depth. The method 300 will be described in conjunction with its performance by the device 100, in particular via the execution of the application 228 and with reference to the components shown in FIGS. 1B, 1C, 2A and 2B.

Figure 4:
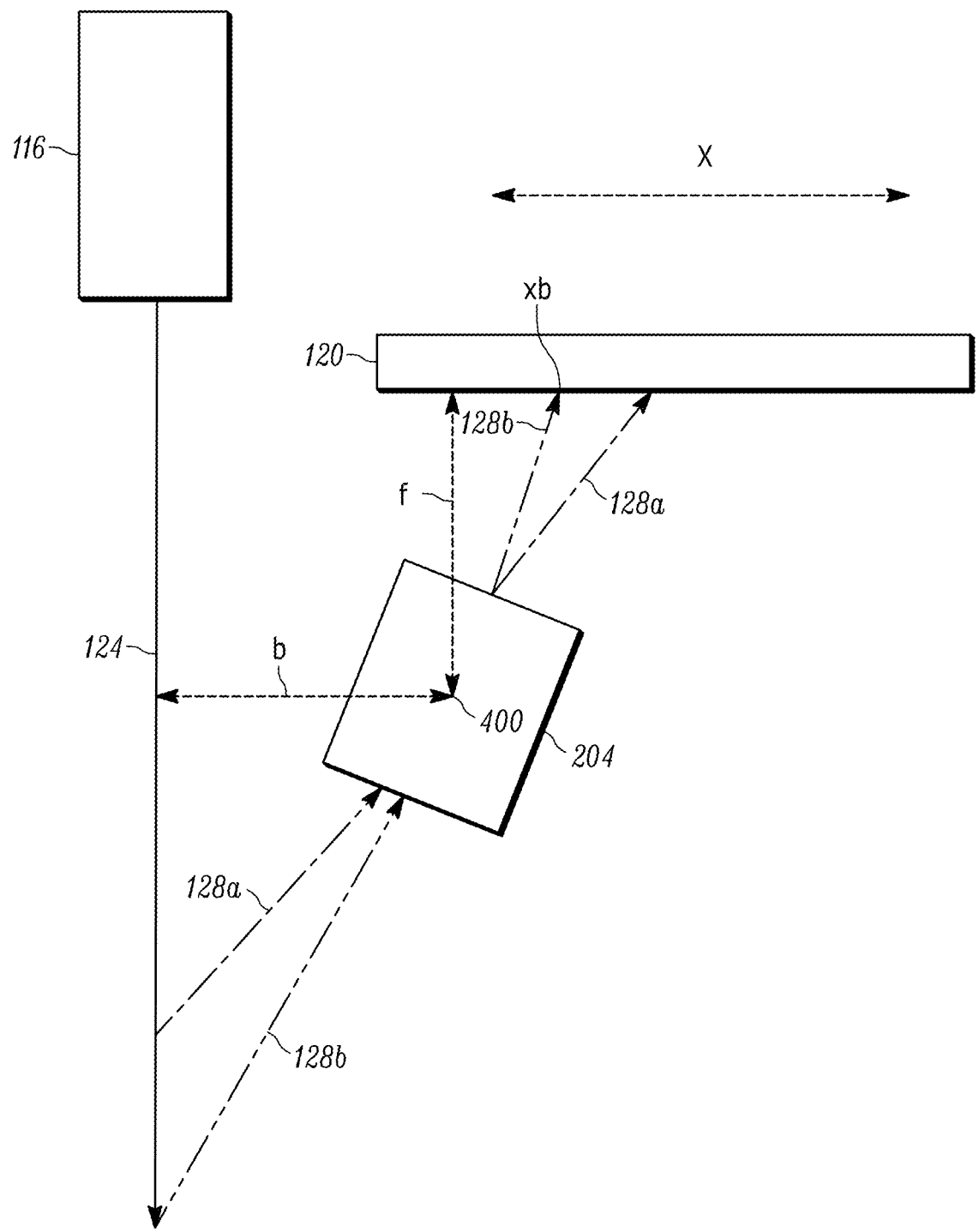
FIG. 4 is a schematic diagram illustrating calibration data for use in the method of FIG. 3.

At block 305, the device 100 is configured to load calibration data for the depth sensing modules. The calibration data may be, for example, stored in the memory 212 with the application 228. The calibration data defines physical relationships between the emitter 116 and the optical assembly 204 of each depth sensing module, as well as the image sensor 120. Specifically, referring to FIG. 4, a simplified representation of the images sensor 120 and one depth sensing module (omitting the mirror 202) is illustrated. As seen in FIG. 4, the angle of the reflection generated by an emitted beam 124 varies with the depth at which the reflection is generated, as well as with the shape of the reflective surface (e.g. a tread 108 or 112 of the tire 104). Two example reflections 128a and 128b are shown, generated at different depths (i.e. indicating surfaces, such as tire treads 108 or 112, at different depths). The reflections 128a and 128b pass through the optical assembly 204 and are directed to the images sensor 120 at different positions. Thus, the depth at which a reflection 128 originated can be determined from the position of the reflection on the image sensor 120. For example, the reflection 128b impacts the image sensor at the point "xb".

To determine the depth at which a reflection 128 originated from image sensor data, the optical assembly 204 may be modeled as a pinhole at the point 400. The depth at which a reflection 128 originated can then be determined with knowledge of the distance "b" between the point 400 and the line along which the beam 124 travels, as well as of the distance "f" from the point 400 to the image sensor 120. For example, for the reflection 128b, the depth may be determined by determining the product of the distance f and the position of the point xb along the X axis, as measured from the beam 124. The above-mentioned product is then divided by the difference between the position of xb and the distance "b". The calibration data loaded at block 305 may therefore include the values for "f" and "b", as determined empirically, for example at the manufacturing of the device 100.

Returning to FIG. 3, at block 310 the device 100 is configured to determine whether to initiate a depth scan. The determination at block 310 can include determining whether an input command has been received from the input device 216, such as a trigger pull, selection of a command element via a touch screen, or the like. In other embodiments, the determination at block 310 includes collecting depth measurements and initiating a scan when the depth measurements fall within a predefined range indicating that the device 100 has been placed against an object such as the tire 104. When the determination at block 310 is negative, the device 100 awaits initiation of a scan.

When the determination at block 310 is affirmative, the device 100 is configured to activate the emitters 116 at block 315, and to receive image data from the image sensor 120. In particular, the image data received at block 315 depicts a reflection 128-1 of the first beam 124-1 in the first portion of the image sensor 120, and a reflection 128-2 of the second beam 124-2 in the second portion of the image sensor 120. As will be discussed in greater detail below, the receipt of one frame from the image sensor, containing depictions of a first reflection and a second reflection, constitutes one sample from which depth measurements can be generated (specifically, two depth measurements, one for each depth sensing module). At block 320, the device 100 is configured to determine whether the scan is complete. Scan completion can be indicated by the release of an input, such as the above-mentioned trigger, or by a distinct input, such as the selection of a stop command via a touch screen. In some examples, the device 100 can terminate the scan if, for example, the motion sensor 226 indicates movement of the device that deviates from the travel direction S beyond a threshold. For example, if the angular orientation of the device 100 changes (indicating that the device is pitching, yawing and/or rolling during traversal of the tire 104) by more than a predetermined threshold, the device 100 may terminate the scan and generate an alert via the display 220 or another suitable output device. In such instances, rather than proceeding to block 325 the device 100 may simply end the performance of the method 300.

When the determination at block 320 indicates that the scan is not complete, the performance of blocks 315 and 320 is repeated. In other words, another sample is collected from the image sensor 120, including another frame depicting another first reflection 128-1 and another second reflection 128-2. The reflections 128 depicted in each successive frame of image data captured at block 315, as will now be apparent, correspond to successive positions on the tire 104 along the travel direction S. Together, in other words, the image data collected through repeated performances of block 315 depicts a profile of the surface of the tire 104 taken along the travel direction S.

Figure 5A:
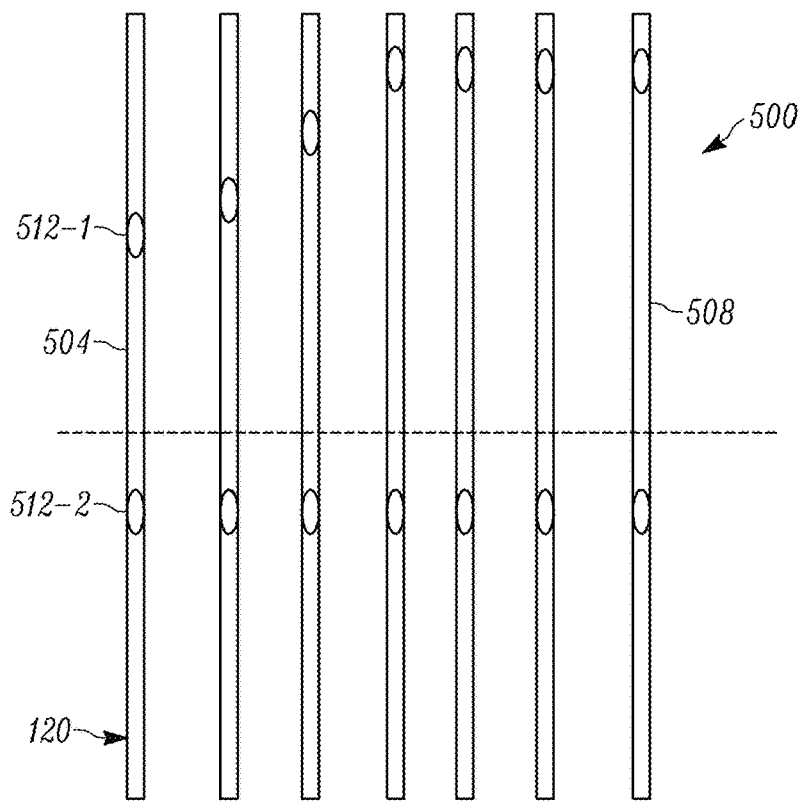
FIGS. 5A-5B illustrate image data captured during performance of the method of FIG. 3.

Turning to FIG. 5A, a set 500 of images is illustrated, beginning with an image 504 and ending with an image 508. That is, the set 500 of images depicts the image data collected through successive performances of block 315 during a depth scan, and thus each image in the set 500 corresponds to a distinct position on the tire 104 along the travel direction S. The image 504 includes a representation 512-1 of a first reflection 128-1 and a representation 512-2 of a second reflection 128-2, in distinct portions of the image (separated by the dashed line shown in FIG. 5A). As shown in FIG. 5A, the location of certain representations 512 within the image data change with the position along the travel direction S at which each image was captured. Changes in the location of a given reflection (e.g. the representations 512-1, in the illustrated example) indicate changes in depth along the travel direction S.

Figure 5B:
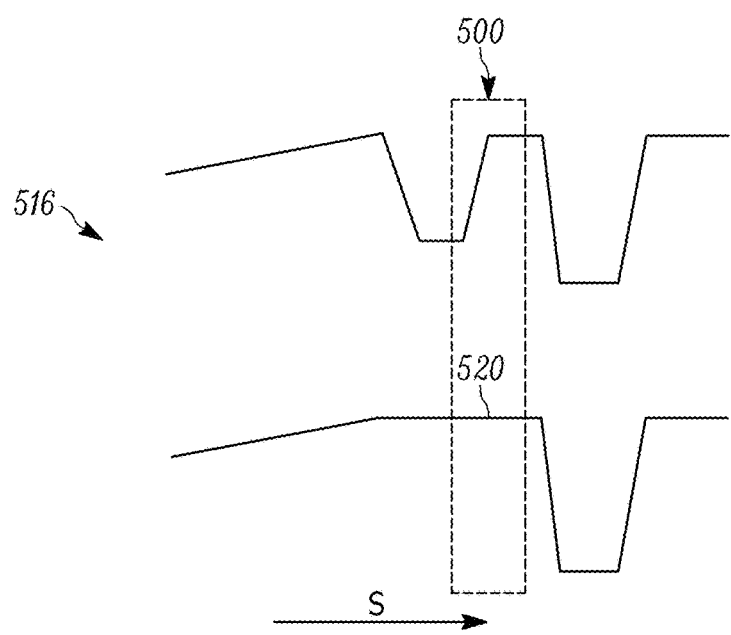

FIG. 5B illustrates the position of the set 500 of images in a larger set 516 of images collected as the device 100 traverses the tire 104 along the travel direction S. The set 516 can be combined into a single image, for example by appending images to the single image after each performance of block 315, or by combining the images following an affirmative determination at block 320. As seen in FIG. 5B, the changes in position of the representation 512-1 over the set 500 of images may correspond to a portion of a minor tread 112, while the static location of the representation 512-2 in the images 500 may correspond to a portion of the tire 104 without treads.

Returning to FIG. 3, at block 325, having completed the depth scan, the device 100 can be configured to normalize the intensity of the representations of reflections 128 (e.g. the representations 512 shown in FIG. 5A), for example to distribute the representations 512 across a predetermined intensity range. For example, the normalization process may distribute the representations across a broader range of intensities than is present in the raw data collected at block 315, which may contain only low intensities. The representations 512 can include one or more pixels, each with one or more color and/or intensity values. For example, each pixel can include a greyscale value between zero (indicating black, or no reflection) and 255 (indicating white, or a maximum-intensity reflection). As will now be apparent to those skilled in the art, the reflections 128 depicted in the image data may vary in intensity according to the depth at which the reflections 128 originated (with greater depths yielding lower intensities in the image data). For example, the device 100 can be configured to apply a function to the image data that adjusts the intensity of each pixel in the image according to its position on the image sensor as a proxy for the angle at which the reflection 128 arrived at the optical assembly 204. The function may, for example, be based on Lambert's law. Various other mechanisms for intensity normalization may also be deployed at block 325. In further examples, block 325 can be omitted.

At block 330, the device 100 is configured to determine, for each sample of image data (e.g. for each of the images shown in FIG. 5A), a first depth measurement corresponding to the first reflection 128-1, as depicted by the representation 512-1, and a second depth measurement corresponding to the second reflection 128-2, as depicted by the representation 512-2. In other examples, block 330 may also be performed for each captured image immediately following block 315.

Figure 6A:
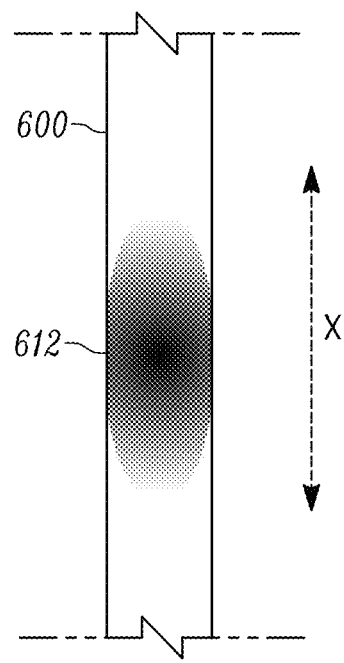
FIGS. 6A-6C illustrate the determination of depth measurements from the image data of FIGS. 5A-5B.
Figure 6B:
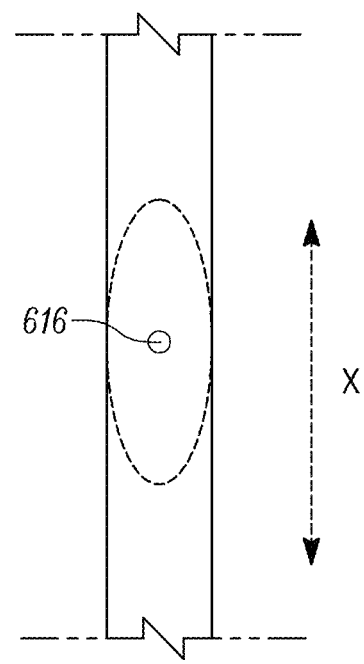

Determination of depth measurements at block 330 can include selecting, for each representation 512, a measurement point. As will now be apparent, the reflections 128 typically impact the image sensor 120 at a plurality of pixel locations, and the representations 512 therefore indicate multiple candidate depths (one for each pixel with a non-zero intensity). The device 100 can therefore be configured, for example to select the pixel from each representation 512 with a peak intensity. In other examples, the device 100 can be configured to determine the center of each representation 512, and to determine a depth measurement based on the location of the center on the image sensor 120. Referring, for example, to FIG. 6A, a portion of an image 600 is shown, including a representation 612 of a reflection 128. As shown in FIG. 6A, the representation 612 includes pixels of varying intensities. At block 330, the device 100 can be configured to select the pixel having the greatest intensity, indicated as the point 616 in FIG. 6B. Based on the position along the separation axis X (which is also the long axis of the linear image sensor 120) of the point 616, the device 100 is configured to determine a depth corresponding to the point 616. For example, with reference to the distances "b" and "f" discussed in connection with FIG. 4, the device 100 can be configured to determine a depth for a measurement point by computing the product of the position "x" of the point along the separation axis X and the distance "f", and dividing the product by the difference between the position "x" and the distance "b". That is, the depth "y" can be determined according to (xf)/(x−b).

Figure 6C:
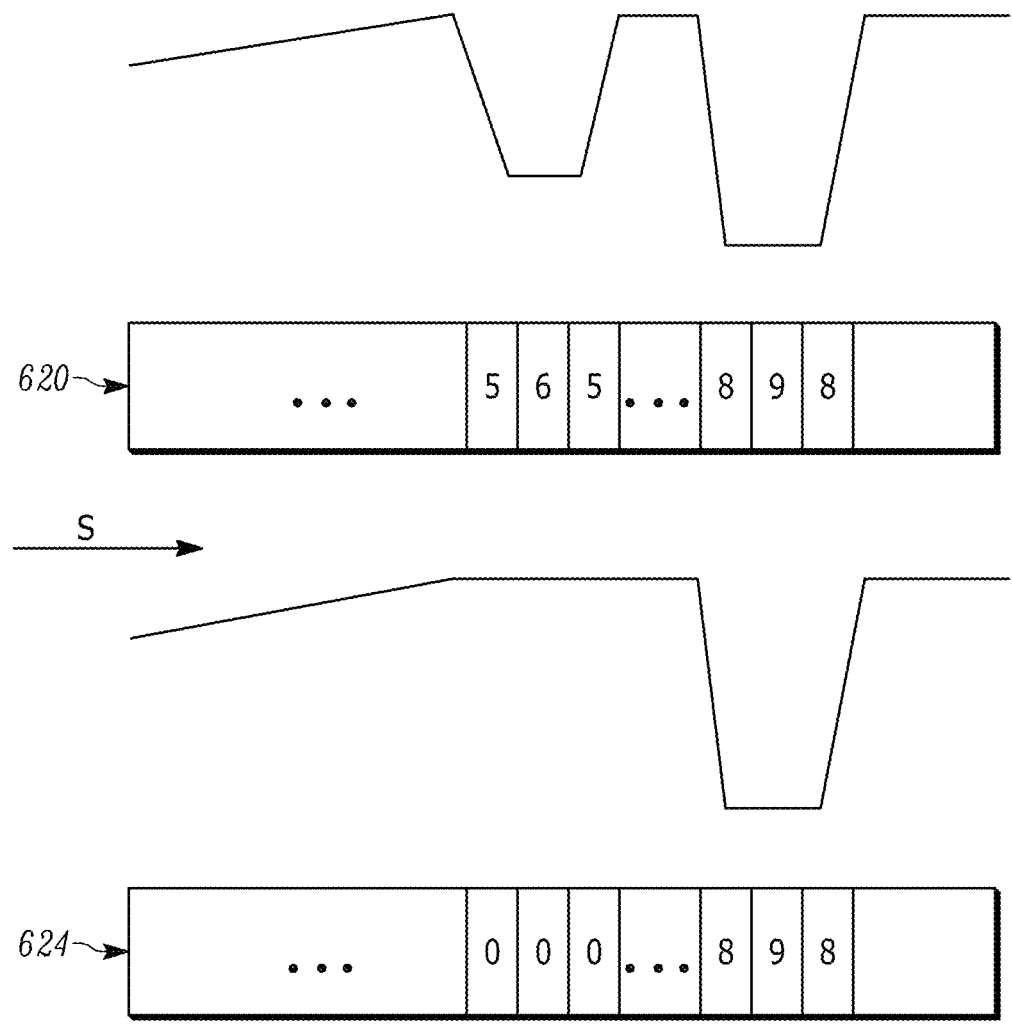

The device 100 is configured to repeat the above-mentioned process for each representation of a reflection in each of the images collected via block 315. That is, because each image contains representations of a first reflection 128-1 and a second reflection 128-2, at block 330 the device determines first and second depth measurements corresponding to each image. As illustrated in FIG. 6C, block 330 results in the generation of a first array 620 of depth measurements corresponding to reflections 128-1 from sequential positions on the tire 104 along the travel direction S. The performance of block 330 also results in the generation of a second array 624 of depth measurements corresponding to reflections 128-2 from the above-mentioned sequential positions on the tire 104 along the travel direction S. The first and second arrays 620 and 624 of depth measurements may not contain matching depth measurements. As illustrated, for example, the first array 620 contains depth measurements of 5/32 inch, 5/32 inch, 6/32 inch for a sequence of three positions along the travel direction S, while for the same sequence of positions the second array 624 contains depth measurements of 9/32 inches, indicating that no tread 108 or 112 was detected by the second depth sensing module at those positions. For example, a minor tread 112 and a major tread 108 may have been in the path of the first beam 124-1, while only the major tread 108 may have been in the path of the second beam 124-2, the minor tread 112 having terminated between the first and second depth sensing assemblies. As will be apparent, the depth of the outer surface of the tire 104 need not be indicated as zero. In the present example, the device 100 is configured to normalize the depth measurements against the surface of the tire 104. In other examples, however, such normalization can be omitted.

Returning to FIG. 3, following the generation of depth measurements at block 330, the device 100 is configured to store the depth measurements in the memory 212. The depth measurements may be stored, for example, for subsequent transmission to another computing device, for presentation on the display 220, or the like. The device 100 can also be configured to perform additional processing in connection with the depth measurements prior to such transmission or presentation. In particular, at block 335, the device 100 is configured to determine updated positions for each of the depth measurements, based on motion data collected during the performance of block 315.

Specifically, at block 315 the device 100 can be configured to collect, along with the image data noted above, a series of acceleration measurements via the motion sensor 226. The acceleration measurements and the image data collected at block 315 (and therefore the depth measurements derived from the image data at block 330) are correlated with each other by timestamp. The device 100 is configured to generate a position corresponding to each depth measurement based on an assumption that the velocity of the device 100 is zero at the initiation of the scan (at block 310), and on the acceleration measurements. The resulting updated positions may indicate that the depth measurements do not correspond to equally-spaced positions along the travel direction S. For example, turning to FIG. 7A, an initial array 700 of depth measurements 700 is illustrated, which are assumed to be equally spaced apart along the travel direction S.

Figure 7A:
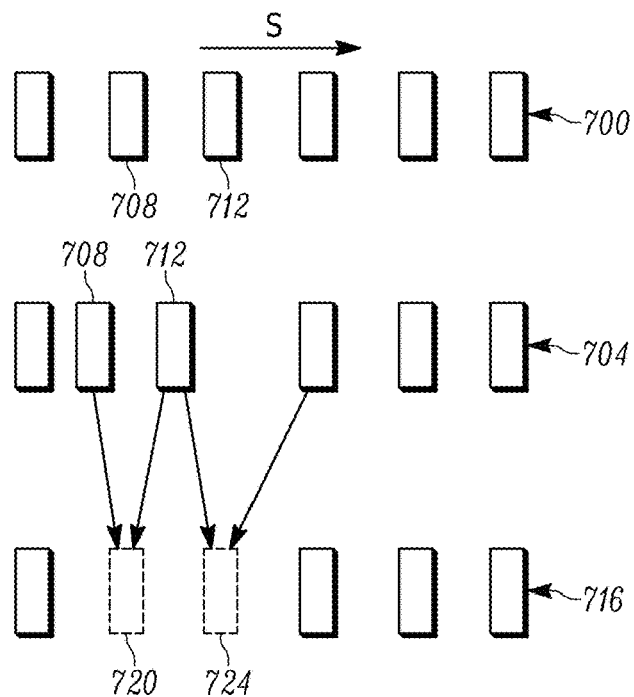
FIG. 7A illustrates the interpolation of additional depth measurements during the performance of the method of FIG. 3.

Based on the acceleration measurements, the depth measurements in the array 700 are assigned updated positions. As shown in FIG. 7A, an updated array 704 of depth measurements is thereby generated, in which the measurements 708 and 712 are assigned corresponding positions that do not match their initially assumed positions (as shown in the array 700). The updated positions of the array 704 indicated that the device 100, rather than travelling at a constant velocity throughout the depth scan, accelerated over the capture of the first four samples.

At block 335, the device 100 can also be configured to resample the depth measurements, by interpolating depth measurements at additional, intermediate positions between those determined via the motion data. For example, still referring to FIG. 7A, a further updated array 716 of depth measurements can be generated at block 335, in which depth measurements 720 and 724, equally spaced with the remaining depth measurements, are interpolated from surrounding depth measurements of the array 704, based on the depth and positions of those surrounding depth measurements.

Returning to FIG. 3, at block 340 the device 100 can also be configured to generate a single combined array of depth measurements from the first and second arrays noted above (e.g. the arrays 620 and 624, or updated versions thereof obtained via block 335). For example, as noted above, in some instances the beams 124-1 and 124-2 both traverse major treads 108 while only one beam 124 traverses a minor tread 112. In the present example, at block 340 the device 100 is configured to generate a combined array of depth measurements by discarding depth measurements indicating disagreement between the arrays 620 and 624.

Figure 7B:
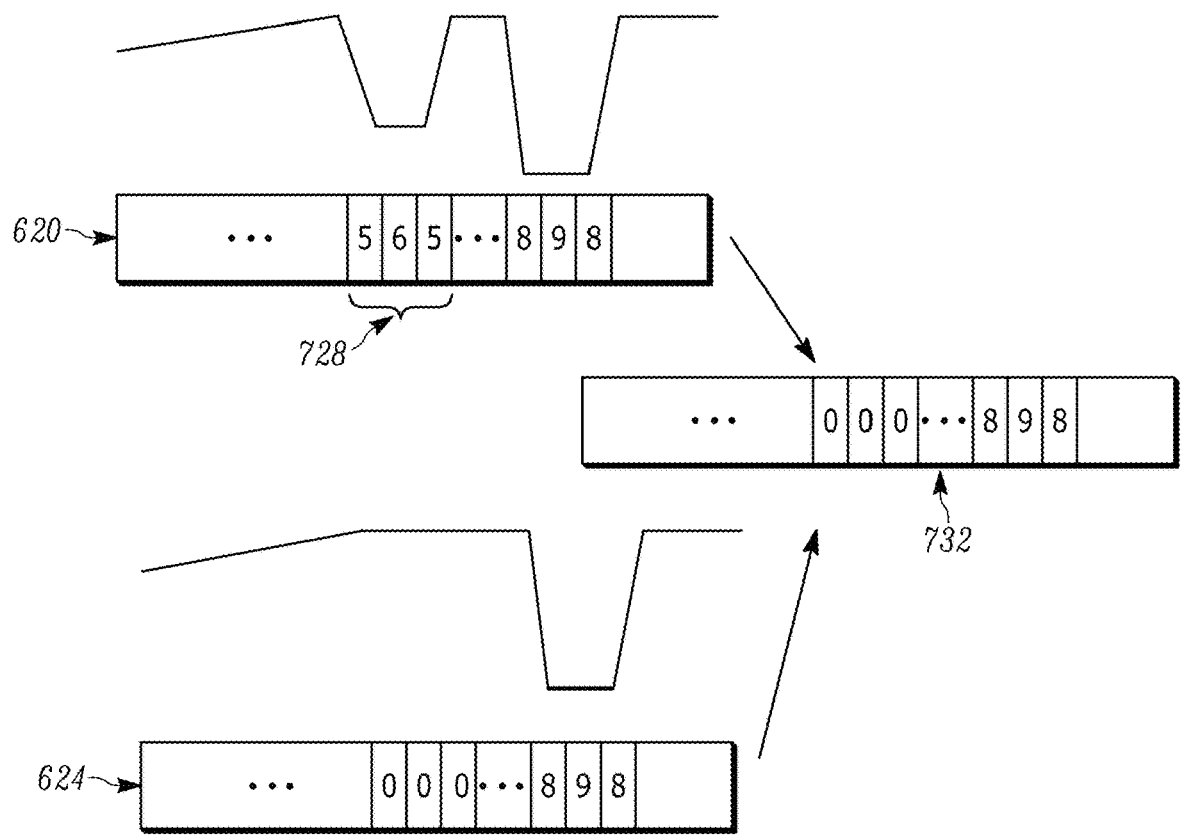
FIG. 7B illustrates the generation of a combined set of depth measurements during the performance of the method of FIG. 3.

For example, the device 100 can be configured, for each position along the travel direction S, the first and second depth measurements from the first and second arrays 620 and 624, to determine whether a difference between the first and second depth measurements exceeds a predetermined threshold that corresponds to a minimum desired tread depth measurement resolution (e.g. ⅓₂ inch). When the determination is affirmative, indicating disagreement between the arrays 620 and 624, the device 100 is configured to select one of the first and second measurements to retain for the combined array of depth measurements. In the present example, assuming that the disagreement stems from the detection of a minor tread 112 by one depth sensing module, the device 100 may be configured to select the measurement having the smallest depth (i.e. to ignore the minor tread). This embodiment is illustrated in FIG. 7B, in which three depth measurements 728 from the array 620 are discarded from a combined array 732. In other embodiments, the device 100 is configured to retain the measurements having the greatest depth rather than those having the smallest depth.

When the difference between the first and second depth measurements for a given position does not exceed the above-mentioned threshold, the first and second depth measurements are in substantial agreement, though they need not be exactly equal. When there is substantial agreement between depth measurements of the arrays 620 and 624), the device 100 can be configured to generate an average of the first and second depth measurements when they do not match (but differ by less than the above-mentioned threshold), or to select either the maximum or minimum of the measurements, for use in the combined array 732. In further examples, in the event of disagreement between first and second depth measurements for a given position, the device 100 is configured to retain both depth measurements. That is, the combined array 732 may contain pairs of depth measurements for certain positions.

Following the performance of block 340, the device 100 is configured to store the combined array 732 of depth measurements, for presentation via the display 220 and/or transmission to another computing device.

Figure 8:
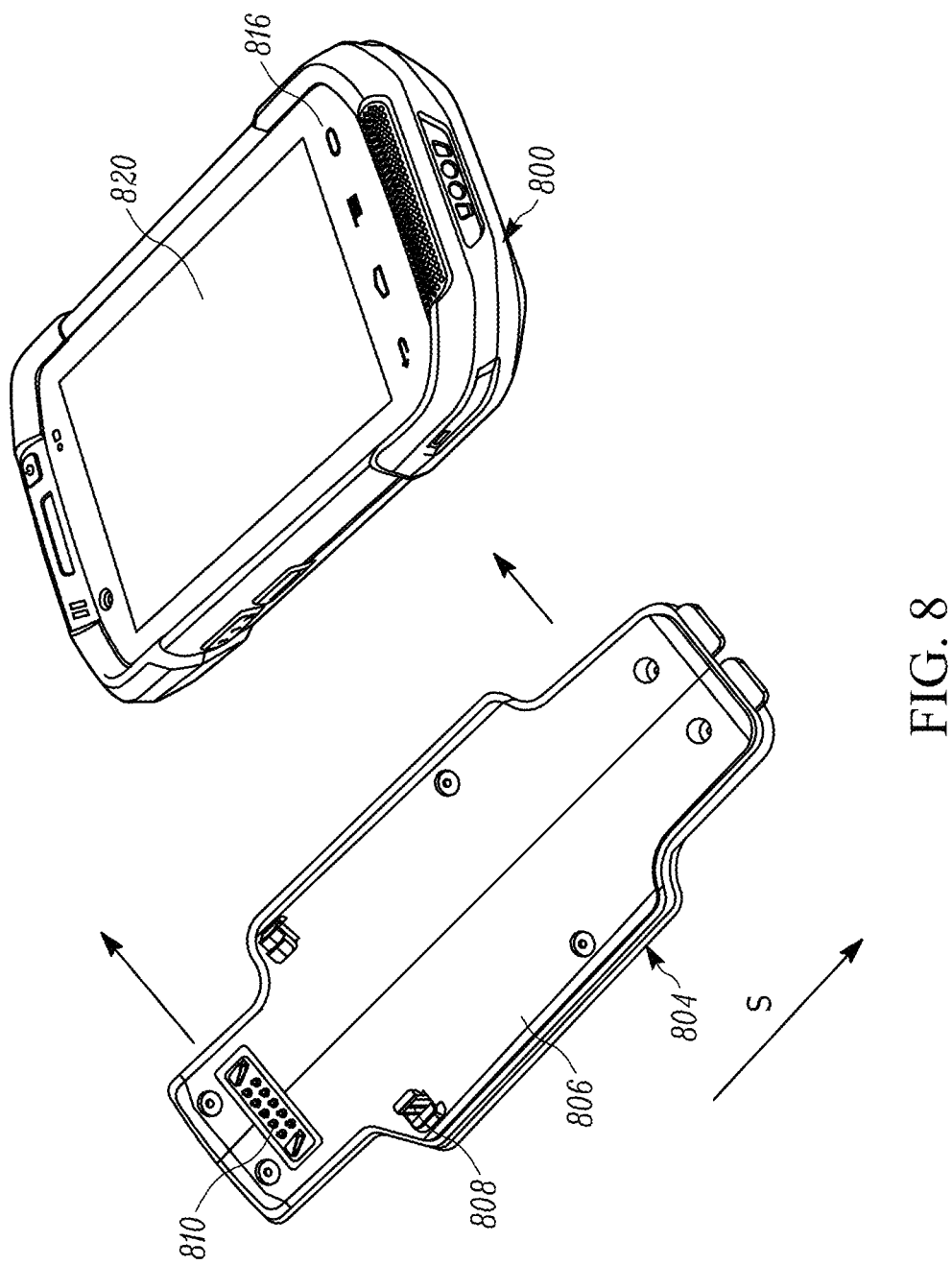
FIGS. 8 and 9 illustrate an example physical implementation of the device of FIGS. 1A-1C and 2A-2B.
Figure 9:
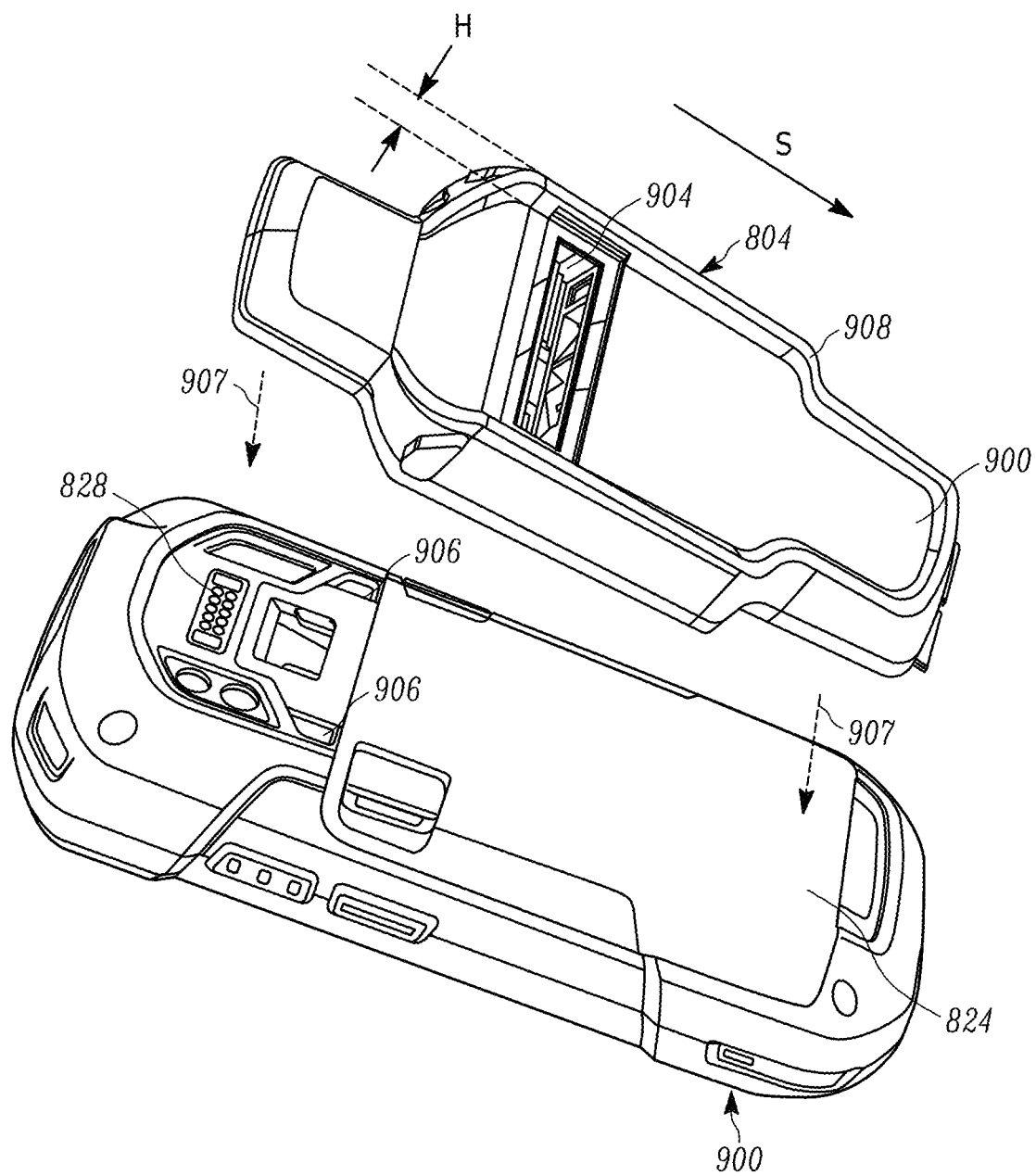

As noted earlier, the depth sensing modules can be integrated with the device 100 or implemented in a discrete accessory mountable on the device 100. Turning to FIGS. 8 and 9, an implementation is illustrated in which the depth sensing modules are disposed in such an accessory.

In particular, FIG. 8 illustrates a mobile computing device 800, such as a smartphone, and an accessory 804. The mobile computing device 800 includes a housing supporting a display 820 and an input device 816 such as a touch screen integrated with the display, one or more selectable buttons, or the like. The accessory 804 includes an inner surface 806 bearing a latching mechanism 808 configured to releasably engage with a rear surface 824 (see FIG. 9) of the device 800. The accessory 804 also includes, on the inner surface 806, a communications port 810 configured to place a controller of the accessory 804 in communication with the device 800, via a corresponding port 828 (see FIG. 9) on the rear surface 824. The port 810, in conjunction with the port 828, enables the accessory 804 to both communicate with and receive electrical power from the device 800. In other examples, the accessory 804 can include a battery or other internal power source, and the ports 810 and 828 may enable only communications rather than communications and power supply. In various embodiments, the communication ports 810, 828 are Pogo style connectors, USB connectors, USB-C, or the like.

Turning to FIG. 9, an outer surface 900 of the accessory 804 includes a window 904 through which the beams 124 exit and reflections 128 enter. That is, the accessory 804 contains the first and second depth sensing modules mentioned above, as well as the processor 208, memory 212, image sensor 120 and motion sensor 226. The device 800, meanwhile, can implement the input device 216 and display 220 noted earlier (via the input device 816 and display 820 shown in FIG. 8). The device 800 can therefore issue scan start and stop commands to the accessory 804 via the ports 810 and 828, and can also be configured to receive depth measurements from the accessory 804 for presentation on the display 820, transmission to a further computing device, or the like.

Also shown in FIG. 9, on the rear surface 824 of the device 800, are recesses 906 for engaging with the latching mechanism 808 shown in FIG. 8 when the inner surface 806 of the accessory 804 is brought into engagement with the rear surface 824 of the device 800 (e.g. by placing the accessory 804 against the rear surface 824 in a direction indicated by the dashed arrows 907).

The accessory 804 can also include, on the outer surface 900 thereof, one or more rails 908 extending along at least some of the outer perimeter of the rear surface 900. When the accessory 804 is engaged with the device 800 in use, the rails 908 are placed against the tire 104 (or any other treaded object to be scanned) at the initiation of a scan, to slide along the treaded surface of the tire 104 in the direction of travel S in order to maintain the depth sensing modules at a predefined depth from the surface of the tire 104, and to mitigate scratching or other damage to the window 904.

A height H of the rails 908 adjacent to the window 904 is selected according to a range of depths that the depth sensing modules 200 are configured to measure. The range of depths measurable by the depth sensing modules 200 is defined by the field of view and focal length of the optical assemblies 204, as well as the size of the image sensor. At depths closer to the optical assemblies 204 than the above-mentioned range, the reflections 128 may become less focused, while at depths further from the optical assemblies 204 than the above-mentioned range, the reflections 128 may be subject to measurement noise. Therefore, the height H of the rails 908 is selected to place the optical assemblies 204 at a distance above the tire 104 (that is, at a depth from the outer surface of the tire 104) that is substantially equal to the minimum depth of the above-mentioned range. For example, when the depth sensing modules 200 are configured to measure depths of between 15 mm and 50 mm, the height H of the rails 908 adjacent to the window 904 is selected to place the optical assemblies 204 approximately 15 mm away from the outer surface of the tire 104 when the rails 908 are engaged with the tire 104.

Variations to the above devices and methods are contemplated. For example, in some embodiments the determination of depth measurements as described above in connection with block 330 can be performed immediately following each performance of block 315. In such embodiments, the termination of the scan (i.e. an affirmative determination at block 320) can be initiated following a determination that the depth measurements have exceeded a termination threshold indicating that the device 100 has likely been withdrawn from the tire 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device for measuring tread depth, comprising:
   an image sensor;
   a first depth sensing module including (i) a first emitter configured to emit a first beam of light, and (ii) a first optical assembly configured to direct reflections of the first beam of light onto a first region of the image sensor;
   a second depth sensing module spaced apart from the first depth sensing module along a separation axis, the second depth sensing module including (i) a second emitter configured to emit a second beam of light; and (ii) a second optical assembly configured to direct reflections of the second beam of light onto a second region of the image sensor;
   a controller connected to the image sensor and configured, responsive to the device traversing a treaded surface in a travel direction substantially perpendicular to the separation axis, to:
      receive, from the image sensor, a sequence of images corresponding to sequential positions of the device traversing the treaded surface in the travel direction, the sequence of images depicting successive reflections of the first and second beams from the treaded surface;
      determine, for each image in the sequence of images, a first depth measurement and a second depth measurement;
      store, in a memory, the first and second depth measurements:
      for each pair of first and second depth measurements, generate a single combined depth measurement; and
      store the combined depth measurements in the memory.

2. The device of claim 1, wherein the controller is further configured, for each pair of first and second depth measurements, to:
   determine whether a difference between the first and second depth measurements exceeds a threshold; and
   when the determination is affirmative, generate the single combined depth measurement by discarding one of the first and second depth measurements.

3. The device of claim 1, wherein the controller is further configured, for each pair of first and second depth measurements, to:
   determine whether a difference between the first and second depth measurements exceeds a threshold; and
   when the determination is negative, generate the single combined depth measurement by averaging the first and second depth measurements.

4. The device of claim 1, further comprising a motion sensor, wherein the controller is further configured to:
   obtain, from the motion sensor, an acceleration measurement corresponding to each image in the sequence of images; and
   determine, based on the acceleration measurements, an updated position along the travel direction for each of the first and second depth measurements.

5. The device of claim 4, wherein the controller is further configured to generate an interpolated depth measurement corresponding to an intermediate position between a pair of the updated positions.

6. The device of claim 1, further comprising a rail configured to slidably engage the treaded surface.

7. The device of claim 1, further comprising:
   an accessory housing supporting the first and second depth sensing modules, the image sensor and the controller.

8. The device of claim 7, wherein the accessory housing includes a latch for releasably engaging a mobile computing device.

9. The device of claim 8, wherein the controller is further configured to transmit the first and second depth measurements to the mobile computing device.

10. A method of measuring tread depth in a device having an image sensor, a controller, a first depth sensing module and a second depth sensing module spaced apart from the first depth sensing module along a separation axis, the method comprising:
    emitting a first beam of light from a first emitter of the first depth sensing module, and directing reflections of the first beam of light onto a first region of the image sensor;
    emitting a second beam of light from a second emitter of the second depth sensing module, and directing reflections of the second beam of light onto a second region of the image sensor;
    at the controller, responsive to the device traversing a treaded surface in a travel direction substantially perpendicular to the separation axis:
       receiving, from the image sensor, a sequence of images corresponding to sequential positions of the device traversing the treaded surface in the travel direction, the sequence of images depicting successive reflections of the first and second beams from the treaded surface;
       determining, for each image in the sequence of images, a first depth measurement and a second depth measurement;
       storing, in a memory, the first and second depth measurements;
       for each pair of first and second depth measurements, generating a single combined depth measurement; and
       storing the combined depth measurements in the memory.

11. The method of claim 10, further comprising, at the controller:
    for each pair of first and second depth measurements:
       determining whether a difference between the first and second depth measurements exceeds a threshold; and
       when the determination is affirmative, generating the single combined depth measurement by discarding one of the first and second depth measurements.

12. The method of claim 10, further comprising, at the controller:
    for each pair of first and second depth measurements:
       determining whether a difference between the first and second depth measurements exceeds a threshold; and
       when the determination is negative, generating the single combined depth measurement by averaging the first and second depth measurements.

13. The method of claim 10, further comprising, at the controller:
    obtaining, from a motion sensor of the device, an acceleration measurement corresponding to each image in the sequence of images; and
    determining, based on the acceleration measurements, an updated position along the travel direction for each of the first and second depth measurements.

14. The method of claim 13, further comprising, at the controller, generating an interpolated depth measurement corresponding to an intermediate position between a pair of the updated positions.

15. The method of claim 10, further comprising, at the controller: transmitting the first and second depth measurements to a mobile computing device.

16. A method of measuring tread depth in a device having an image sensor, a controller, a first depth sensing module and a second depth sensing module spaced apart from the first depth sensing module along a separation axis, the method comprising:
- emitting a first beam of light from a first emitter of the first depth sensing module, and directing reflections of the first beam of light onto a first region of the image sensor;
- emitting a second beam of light from a second emitter of the second depth sensing module, and directing reflections of the second beam of light onto a second region of the image sensor;
- at the controller, responsive to the device traversing a treaded surface in a travel direction substantially perpendicular to the separation axis:
  - receiving, from the image sensor, a sequence of images corresponding to sequential positions of the device traversing the treaded surface in the travel direction, the sequence of images depicting successive reflections of the first and second beams from the treaded surface;
  - determining, for each image in the sequence of images, a first depth measurement and a second depth measurement;
  - storing, in a memory, the first and second depth measurements;
  - obtaining, from a motion sensor of the device, an acceleration measurement corresponding to each image in the sequence of images; and
  - determining, based on the acceleration measurements, an updated position along the travel direction for each of the first and second depth measurements.

17. The method of claim 16, further comprising, at the controller:
- for each pair of first and second depth measurements:
  - determining whether a difference between the first and second depth measurements exceeds a threshold; and
  - when the determination is affirmative, generating the single combined depth measurement by discarding one of the first and second depth measurements.

18. The method of claim 16, further comprising, at the controller:
- for each pair of first and second depth measurements:
  - determining whether a difference between the first and second depth measurements exceeds a threshold; and
  - when the determination is negative, generating the single combined depth measurement by averaging the first and second depth measurements.

* * * * *